United States Patent [19]

Takano et al.

[11] Patent Number: 5,787,392
[45] Date of Patent: Jul. 28, 1998

[54] SPEECH SIGNAL PROCESSING CIRCUIT AND METHOD FOR DECODING A CODED SPEECH SIGNAL BY CONTROLLING OPERATION OF A BAND SYNTHESIS FILTER

[75] Inventors: Hideto Takano; Yoshitaka Shibuya, both of Tokyo, Japan

[73] Assignee: NEC Corporation, Tokyo, Japan

[21] Appl. No.: 625,221

[22] Filed: Apr. 1, 1996

[30] Foreign Application Priority Data

Mar. 30, 1995  [JP]  Japan .................................. 7-072924

[51] Int. Cl.$^6$ .................................................. G10L 7/04
[52] U.S. Cl. ..................... 704/230; 704/500; 704/501; 704/502
[58] Field of Search ........................ 395/2.91–2.95, 395/2.1, 2.33–2.39; 704/500–504, 201, 224–230

[56] References Cited

U.S. PATENT DOCUMENTS

| | | | |
|---|---|---|---|
| 4,455,649 | 6/1984 | Esteban et al. | 370/80 |
| 5,053,989 | 10/1991 | Masaki | 364/900 |
| 5,231,484 | 7/1993 | Gonzales et al. | 358/133 |
| 5,247,130 | 9/1993 | Suzuki et al. | 84/622 |
| 5,361,097 | 11/1994 | Kolczynski | 348/390 |
| 5,387,941 | 2/1995 | Montgomery et al. | 348/473 |
| 5,400,148 | 3/1995 | Kashida et al. | 358/324 |
| 5,566,208 | 10/1996 | Balakrishnan | 375/240 |
| 5,570,197 | 10/1996 | Boon | 386/46 |
| 5,594,492 | 1/1997 | O'Callaghan et al. | 348/10 |
| 5,617,145 | 4/1997 | Huang et al. | 348/423 |
| 5,625,356 | 4/1997 | Lee et al. | 341/67 |

OTHER PUBLICATIONS

"Information Technoloby—Coding of Moving Pictures and Associated Audio for Digital Storage Media At Up to About 1.5 Mbits/s" ISO/IEC 11172-3: 1 & 30–39, (1994).

Primary Examiner—David R. Hudspeth
Assistant Examiner—Michael N. Opsasnick
Attorney, Agent, or Firm—Foley & Lardner

[57] ABSTRACT

A speech signal processing circuit includes an input buffer for receiving inverse quantization samples and for temporarily storing those samples. The circuit also includes a band synthesis filter for reading the inverse quantization samples stored in the input buffer one by one, and for conducting quadrature conversion processing and sum-of-product operation processing to decode the samples into speech signals. The circuit further includes a control circuit for controlling operation of the band synthesis filter. When the inverse quantization samples are recognized as being stored in the input buffer, the control circuit controls the band synthesis filter to execute, as an initial operation, the quadrature conversion processing of the inverse quantization samples as many times as a number corresponding to an operation delay time of the band synthesis filter. After completion of the initial operation, the control circuit control the band synthesis filter to continue, as a steady operation, the quadrature conversion processing of the inverse quantization samples stored in the input buffer, as well as to conduct the sum-of-product operation processing with respect to the results of the quadrature conversion processing.

17 Claims, 9 Drawing Sheets

SPEECH SIGNAL PROCESSING CIRCUIT AND METHOD FOR DECODING A CODED SPEECH SIGNAL BY CONTROLLING OPERATION OF A BAND SYNTHESIS FILTER

BACKGROUND OF THE INVENTION

1. Field of the Invention

The present invention relates to a speech signal processing circuit for combining coded speech signals and a speech signal processing method therefor, and, more particularly, to a speech signal processing circuit for decoding speech signals encoded according to MPEG standards and a speech signal processing method therefor.

2. Description of the Related Art

Known as a speech signal coding system for television and the like is MPEG (Moving Picture Expert Group) whose standarization was studied by ISO/IEC, JTC1/SC2/WG8. One of these MPEG standards (hereinafter referred to as MPEG audio standards) which is provided for in the recommendation ISO/IEC-11172-3 (1993) (Literature 1) prescribes for a decoder for coded speech signals.

FIG. 7 is a block diagram showing an example of structure of a conventional speech signal processing circuit which decodes speech signals coded upon MPEG audio standards.

As illustrated in the figure, the conventional speech signal processing circuit includes a divider circuit (clock divider) 10 for generating a sum-of-product operation start signal SM in response to application of a clock start signal SC and based on a reference clock CK, a control circuit 120 for generating a clock start signal SC to control the entire operation of the speech signal processing circuit, an input buffer 30 for temporarily storing an inverse quantization sample IQ, a 512-order band synthesis filter 140 and a filter buffer control circuit 50 for designating an address for storing a quadrature conversion result RA and an address for sum-of-product operation in a filter buffer.

The band synthesis filter 140 includes a quadrature conversion circuit 141 for conducting quadrature conversion of inverse quantization samples stored in the input buffer 30, a filter buffer 142 for storing quadrature conversion results RA and a sum-of-product operation circuit 143 for conducting sum-of-product operation in response to a sum-of-product operation start signal SM to output a speech signal AF and a sum-of-product end signal EM.

With reference to the block diagram of FIG. 7, an operation time chart shown in FIG. 8 and a flow chart in FIG. 9, description will be give of operation of the conventional speech signal processing circuit structured as described above.

First, upon storing an inverse quantization sample IQ (Step 901), the input buffer 30 supplies a band synthesis start signal SB to the control circuit 120. In response to the application of the band synthesis start signal SB, the control circuit 120 supplies a clock start signal SC to the divider circuit 10. Upon receiving the clock start signal SC, the divider circuit 10 starts outputting the sum-of-product operation start signal SM with a cycle of 1/fs (=ts) which is obtained by dividing the reference clock CK by a sampling frequency fs and supplies the same to the sum-of-product operation circuit 143 in the band synthesis filter 140.

The sum-of-product operation circuit 143 executes sum-of-product operation in response to the application of the sum-of-product operation start signal SM, and sends the sum-of-product operation end signal EM to the control circuit 120 when the sum-of-product operation is completed. The control circuit 120 supplies a quadrature conversion start signal SA to the quadrature conversion circuit 141 every time it receives the sum-of-product end signal EM (Step 902). The quadrature conversion circuit 141 conducts quadrature conversion of inverse quantization samples IQ stored in the input buffer 30 in response to the application of the quadrature conversion start signal SA.

Here, the quadrature conversion by the quadrature conversion circuit 141 is conducted with respect one inverse quantization sample IQ each time the quadrature conversion start signal SA is applied (hereinafter, quadrature conversion on a one-sample basis is referred to as sample conversion) and the conversion result RA is stored at a predetermined address in the filter buffer 142. The address for storing the conversion result RA is designated by the filter buffer control circuit 50.

Upon reception of the quadrature conversion start signal SA 32 times and completion of sample conversion with respect to 32 inverse quantization samples IQ by the quadrature conversion circuit 141 in a manner as described above, one quadrature conversion according to the MPEG audio standards ends (Step 903). The foregoing operation processing will be defined as a steady operation.

The conversion results RA obtained through the foregoing operations are stored in the filter buffer 142 and accumulated as many as the number equivalent to 16 quadrature conversions, that is, the conversion results RA with respect to 512 (=32×16) samples are accumulated. Then, every time the sum-of-product operation circuit 143 receives the sum-of-product operation start signal SM, the circuit reads the conversion results RA on a one-sample basis from the filter buffer 142 to execute the sum-of-product operation and externally outputs the sum-of-product operation result as the speech signal AF for one sample, while outputting the sum-of-product operation end signal EM.

The above-described conventional speech signal processing circuit in accordance with the provisions of Layer 1 and Layer 2 of the MPEG audio standards involves a delay equivalent to the sampling cycles ts for some 256 samples because of the characteristics of the band synthesis filter 140. It therefore takes time for 256 samples, that is, it takes 256×ts, before the sum-of-product operation circuit 43 starts outputting the speech signal AF after the inverse quantization sample IQ is stored in the input buffer 30. With a sampling frequency fs of 48 kHz, for example, the above delay time will be some 5 ms (=(256×ts)/48 kHz), which is not appropriate for such use in broadcasting requiring precise synchronization with images.

As described in the foregoing, conventional speech signal processing circuit and speech signal processing method have shortcomings that delay to such an extent that hinders practical use might be caused because a band synthesis filter involves a delay equivalent to the sampling cycles for some 256 samples.

SUMMARY OF THE INVENTION

A first object of the present invention is to eliminate the above-described conventional drawbacks and provide a speech signal processing circuit and a speech signal processing method which allow a delay time caused between input of an inverse quantization sample and output of a speech signal to be drastically reduced down to such an extent that will have no adverse effect in practical use.

In addition to the above object, a second object of the present invention is to provide a speech signal processing circuit and a speech signal processing method by which output of speech signals can be controlled by setting a desired delay time.

According to the first aspect of the invention, a speech signal processing circuit for decoding a coded speech signal, comprising:

an input buffer for receiving and temporarily storing a coded speech signal sample;

a band synthesis filter for reading a coded speech signal sample stored in said input buffer and conducting quadrature conversion processing and sum-of-product operation processing to decode the coded speech signal sample into a speech signal; and control means for controlling operation of said band synthesis filter, said control means including:
initial operation executing means for, when recognizing a coded speech signal sample as being stored in said input buffer, conducting, as an initial operation of said band synthesis filter, the quadrature conversion processing of said coded speech signal samples as many times as a number predetermined corresponding to an operation delay time of said band synthesis filter, and steady operation executing means for repeatedly and continuously executing, as a steady operation of said band synthesis filter, the quadrature conversion processing of the coded speech signal samples stored in said input buffer and the sum-of-product operation processing with respect to the results of said quadrature conversion processing after said initial operation is completed.

In the preferred construction, the number of repetitions of the quadrature conversion processing in said initial operation equals a value obtained by dividing the operation delay time of said band synthesis filter by a sample cycle of said coded speech signal sample.

In another preferred construction, the band synthesis filter comprises conversion end notifying means for, when the quadrature conversion processing for one sample of the coded speech signal samples is executed, notifying said initial operation executing means of said control means of the end of the quadrature conversion of the one sample, and the initial operation executing means recognizes a coded speech signal sample as being stored in said input buffer to control said band synthesis filter to execute the initial operation, counts the number of executions of the quadrature processing based on the notification from said conversion end notifying means, and completes the initial operation to transfer processing to said steady operation executing means when recognizing the quadrature conversion processing as being conducted as many times as a value obtained by dividing the operation delay time of said band synthesis filter by a sample cycle of said coded speech signal sample.

In the preferred construction, the band synthesis filter comprises conversion end notifying means for, when the quadrature conversion processing of one sample of the coded speech signal samples is conducted, transmitting an end signal indicative of the end of the quadrature conversion of the one sample to the initial operation executing means of said control means, and the initial operation executing means recognizes a coded speech signal sample as being stored in said input buffer to transmit a start signal for executing the quadrature conversion processing of one sample to said band synthesis filter, counts the number of executions of the quadrature conversion processing based on the end signal sent from said conversion end notifying means after the quadrature conversion processing is executed in response to said start signal, and transmits another start signal for executing the quadrature conversion of one sample to said band synthesis filter in response to the application of said end signal until the quadrature conversion processing is completed said predetermined number of times.

In another preferred construction, the control means comprises steady operation start control means for controlling timing for starting execution of the steady operation under the control of said steady operation executing means, said steady operation start control means instructing said steady operation executing means to start execution of the steady operation in response to an externally applied request signal.

Also, the band synthesis filter comprises conversion end notifying means for, when the quadrature conversion processing for one sample of the coded speech signal samples is executed, notifying the initial operation executing means of said control means of the end of the quadrature conversion of the one sample, the control means comprises steady operation start control means for controlling timing for starting execution of the steady operation under the control of said steady operation executing means, the initial operation executing means recognizes a coded speech signal sample as being stored in said input buffer to control said band synthesis filter to execute the initial operation, counts the number of executions of the quadrature processing based on the notification from said conversion end notifying means, and completes the initial operation to transfer processing to said steady operation start control means when recognizing the quadrature conversion processing as being conducted as many times as a value obtained by dividing the operation delay time of said band synthesis filter by a sample cycle of said coded speech signal sample, and the steady operation start control means instructs said steady operation executing means to start execution of the steady operation in response to an externally applied request signal.

According to the second aspect of the invention, a speech signal processing method for decoding a coded speech signal implemented by a speech signal processing circuit including an input buffer for receiving and temporarily storing a coded speech signal sample, a band synthesis filter for reading the coded speech signal samples stored in said input buffer one by one and conducting quadrature conversion processing and sum-of-product operation processing to decode the coded speech signal samples into speech signals, and control means for controlling operation of said band synthesis filter, said method comprising the steps of:

a first step at which said input buffer receives input of a coded speech signal sample, a second step at which said control means recognizes a coded speech signal sample as being stored in said input buffer and executes, as an initial operation of said band synthesis filter, the quadrature conversion processing of said coded speech signal samples as many times as a number predetermined corresponding to an operation delay time of said band synthesis filter, and a third step at which said control means repeatedly and continuously executes, as a steady operation of said band synthesis filter, the quadrature conversion processing of the coded speech signal samples stored in said input buffer and the sum-of-product operation processing with respect to the results of said quadrature conversion processing after said initial operation is completed.

In this case, the band synthesis filter comprises conversion end notifying means for, when the quadrature conversion processing of one sample of the coded speech signal samples is conducted, notifying initial operation executing means of said control means of the end of the quadrature conversion for the one sample, and wherein the second step for executing the initial operation under the control of said control means comprises the steps of:

recognizing a coded speech signal sample as being stored in said input buffer to control said band synthesis filter to execute the initial operation, when said band synthesis filter conducts the quadrature conversion processing for one sample of the coded speech signal samples, accepting notification of the end of the quadrature conversion of the one sample sent from said conversion end notifying means to said control means and counting the number of executions of the quadrature conversion processing based on the notification from said band synthesis filter, and completing the initial operation to start said steady operation when recognizing the quadrature conversion processing as being executed said predetermined number of times.

In the above-mentioned construction, the speech signal processing method further comprises a third step at which said control means waits for a request signal be externally applied and instructs on the start of execution of the steady operation in response to the application of the request signal after the completion of the second step.

According to the third aspect of the invention, a computer readable memory which is installed in a speech signal processing circuit including an input buffer for receiving and temporarily storing a coded speech signal sample, a band synthesis filter for reading the coded speech signal samples stored in said input buffer one by one and conducting quadrature conversion processing and sum-of-product operation processing to decode the coded speech signal samples into speech signals, and control means for controlling operation of said band synthesis filter, and which stores a computer program instructing said control means to control operation of said band synthesis filter, said computer program comprising the steps of:

a first step for recognizing a coded speech signal sample as being stored in said input buffer and executing, as an initial operation of said band synthesis filter, quadrature conversion processing of said coded speech signal samples as many times as a number predetermined corresponding to an operation delay time of said band synthesis filter, a second step for waiting for a request signal to be externally applied and instructing on the start of execution of a steady operation in response to the application of the request signal after the completion of said first step, and a third step for repeatedly and continuously executing the quadrature conversion processing of the coded speech signal samples stored in said input buffer and the sum-of-product operation processing with respect to the results of said quadrature conversion processing as the steady operation of said band synthesis filter after the completion of said initial operation.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

Preferred embodiments of the present invention will be described in detail with reference to the accompanying drawings.

Figure 1:
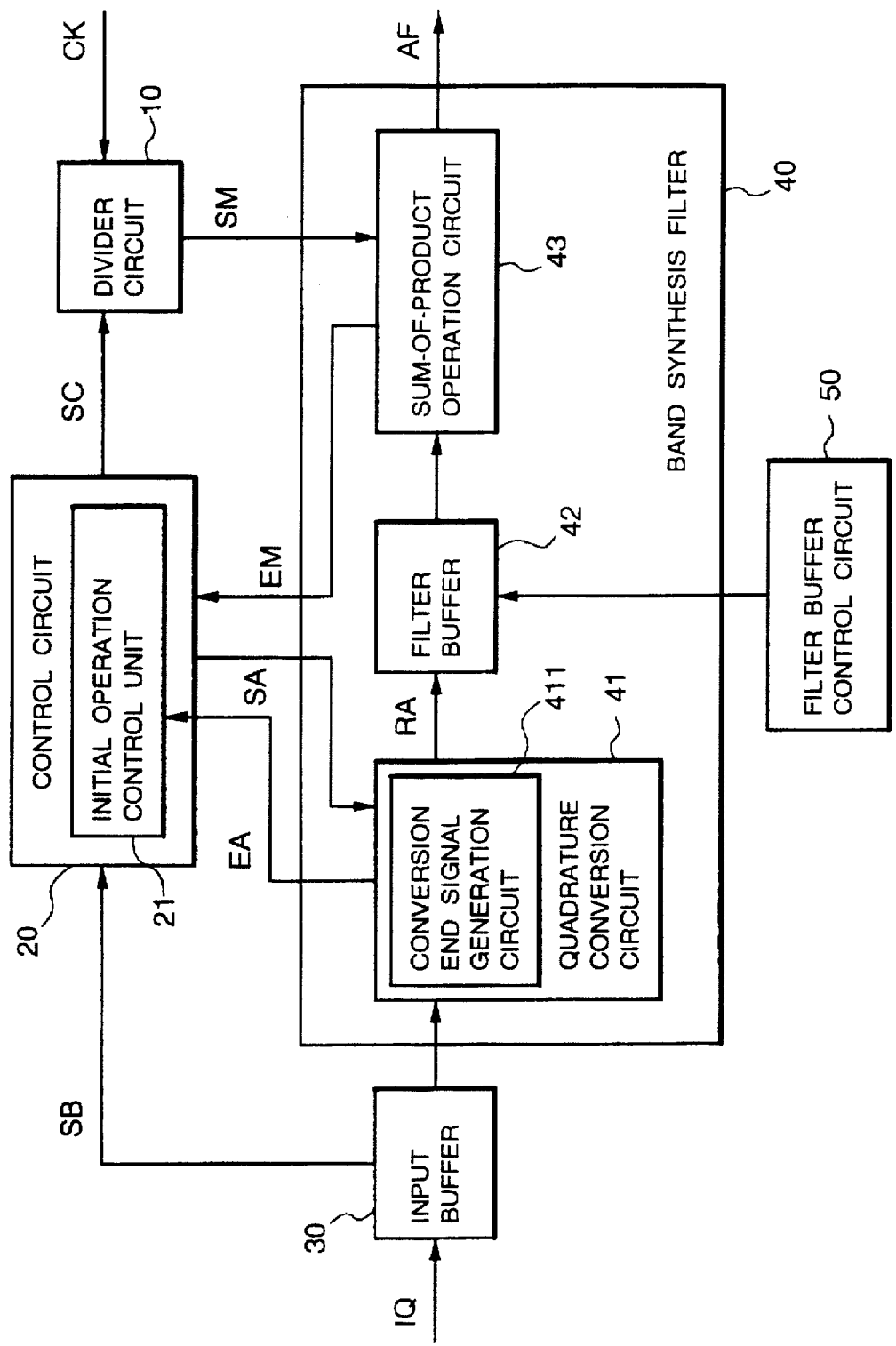
FIG. 1 is a block diagram showing structure of a speech signal processing circuit according to a first embodiment of the present invention.

FIG. 1 is a block diagram showing structure of a speech signal processing circuit according to a first embodiment of the present invention.

As illustrated in the figure, the speech signal processing circuit of the present embodiment includes an input buffer 30 for receiving and temporarily storing inverse quantization samples, a band synthesis filter 40 for converting inverse quantization samples into speech signals, a divider circuit 10 and a control circuit 20 for controlling operation timing of the band synthesis filter 40, and a filter buffer control circuit 50 for controlling a filter buffer in the band synthesis filter 40. The band synthesis filter 40 includes a quadrature conversion circuit 41 for conducting quadrature conversion of inverse quantization samples, a filter buffer 42 for storing quadrature conversion results and a sum-of-product operation circuit 43 for executing sum-of-product operation with respect to quadrature operation results to output speech signals. Each of the above-described components is implemented by program-controlled CPUs, memories and the like of personal computers and workstation terminals. It is assumed in the present embodiment that delay time of the band synthesis filter 40 is equivalent to the sampling cycles ts for 256 samples, that is, 256×ts. In the figure, only the characteristic components of the present embodiment are shown and no illustration will be given of the other components.

In response to application of a clock start signal SC from the control circuit 20, the divider circuit 10 starts outputting a sum-of-product operation start signal SM with a cycle of 1/fs (=ts) which is obtained by dividing a reference clock CK by a sampling frequency fs and supplies the signal SM to the sum-of-product operation circuit 43 of the band synthesis filter 40.

The control circuit 20 outputs a quadrature conversion start signal SA and supplies the same to the quadrature conversion circuit 41 in response to the application of a band synthesis start signal SB from the input buffer 30, a quadrature conversion end signal EA from the quadrature conversion circuit 41 installed in the band synthesis filter 40 or a sum-of-product operation end signal EM from the sum-of-product operation circuit 43 installed in the band synthesis filter 40. This enables control of operation timing of the quadrature conversion processing executed by the quadrature conversion circuit 41.

More specifically, after outputting the quadrature conversion start signal SA in response to the application of the band synthesis start signal SB, the control circuit 20 repeats processing for outputting the quadrature conversion start signal SA a predetermined number of times in response to the application of the quadrature conversion end signal EA from the quadrature conversion circuit 41. The foregoing operation corresponds to an initial operation to be described later which is controlled by an initial operation control unit 21 installed in the control circuit 20. The number of times of inputting of the quadrature end signal EA and outputting of the quadrature conversion start signal SA during the initial operation is determined according to a delay time of the band synthesis filter 40. With a delay time of the band synthesis filter 40 being 256×ts, for example, operation is controlled so as to execute sample conversion with respect to 256 samples, that is, to execute quadrature conversion eight times. Thereafter, processing will be repeated, as the steady operation, for outputting the quadrature start signal SA in response to the application of the sum-of-product operation end signal EM.

In addition, after repeating the processing for outputting the quadrature conversion start signal SA a predetermined number of times in response to the application of the quadrature conversion end signal EA, the control circuit 20 outputs the clock start signal SC and supplies the same to the divider circuit 10, thereby controlling start and end of the sum-of-product operation of the sum-of-product operation circuit 43.

The input buffer 30 receives and temporality stores the inverse quantization sample IQ. Moreover, the input buffer outputs the band synthesis start signal SB and supplies the same to the control circuit 20 in response to the application of the inverse quantization sample IQ.

The quadrature conversion circuit 41 of the band synthesis filter 40 acquires the inverse quantization sample IQ from the input buffer 30 and conducts quadrature conversion with respect to the same in response to the application of the quadrature conversion start signal SA from the control circuit 20. The quadrature conversion by the quadrature conversion circuit 41 is carried out similarly to a conventional manner by converting inverse quantization samples IQ one by one and storing a conversion result RA at a predetermined address in the filter buffer 42 at the reception of each quadrature conversion start signal SA. The address for storing the conversion result RA is designated by the filter buffer control circuit 50.

During the executions of sample conversion a predetermined number of times as the initial operation, a conversion end signal generation circuit 411 installed in the quadrature conversion circuit 41 outputs the quadrature conversion end signal EA and supplies the same to the initial operation control unit 21 of the control circuit 20 every time the sample conversion is conducted. This enables the initial operation control unit 21 to recognize whether the said sample conversion is the initial operation or not and count the number of times the sample conversion as the initial operation is executed.

The filter buffer 42 stores and accumulates the conversion results RA of 16 quadrature conversions, that is, the conversion results RA for 512 (=32×16) samples obtained by the quadrature conversion circuit 41.

The sum-of-product operation circuit 43 reads the conversion result RA of each sample one by one from the filter buffer 42 for executing the sum-of-product operation in response to the application of the sum-of-product operation start signal SM. Then, the circuit 43 externally outputs a speech signal AF of one sample as the sum-of-product operation result, while outputting the sum-of-product operation end signal EM and supplying the same to the control circuit 20.

The filter buffer control circuit 50, when the quadrature conversion circuit 41 stores the conversion result RA in the filter buffer 42, designates an address for storage as described in the foregoing.

Figure 2:
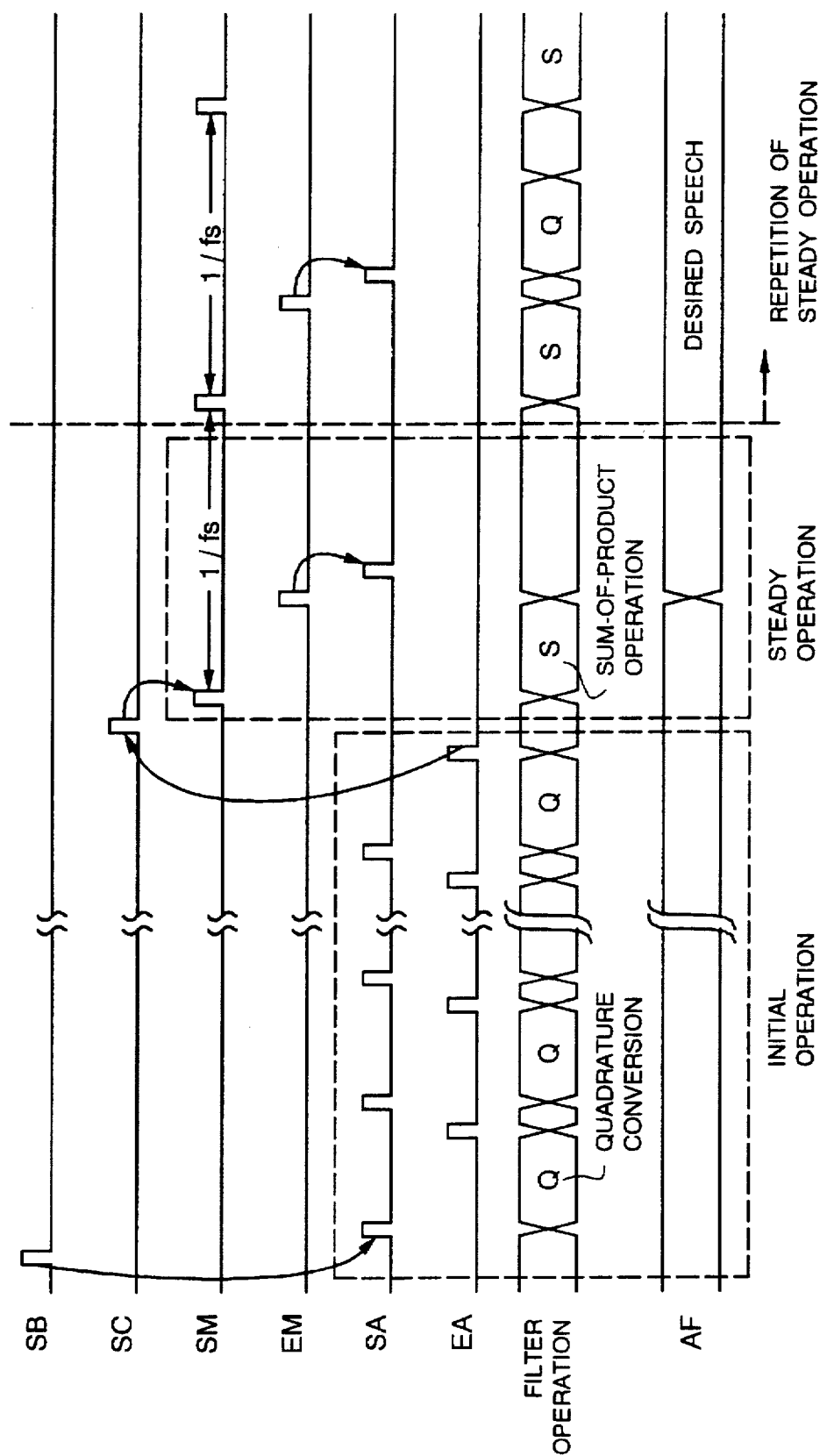
FIG. 2 is an operation time chart showing processing steps according to the first embodiment.

Operation of the present embodiment will be described with reference to the block diagram of FIG. 1, the operation time chart of FIG. 2 and the flow chart of FIG. 3.

First, upon storing the inverse quantization sample IQ (Step 301), the input buffer 30 supplies the band synthesis start signal SB to the control circuit 20. The initial operation control unit 21 of the control circuit 20 supplies the quadrature conversion start signal SA to the quadrature conversion circuit 41 of the band synthesis filter 40 in response to the application of the band synthesis start signal SB.

In response to the application of the quadrature conversion start signal SA, the quadrature conversion circuit 41 conducts sample conversion for one sample and stores the conversion result RA in the filter buffer 42 (Step 302). Then, the conversion end signal generation circuit 411 outputs the quadrature conversion end signal EA and supplies the same to the control circuit 20.

The control circuit 20 supplies the quadrature conversion start signal SA to the quadrature conversion circuit 41 in response to the application of the quadrature conversion end signal EA. Thus supplying the quadrature conversion start signal SA to the quadrature conversion circuit 41 every time sample conversion is completed with respect to one sample leads to repetition of sample conversion on a sample basis. The initial operation control unit 21 recognizes the sample conversion in the above operations and counts the number of repetitions of the sample conversion. The sample conversion is conducted as many times as the number equivalent to eight quadrature conversions, that is, 256 (=32×8) times, under the control of the initial operation control unit 21 (Step 303). Operations at the foregoing Steps 202 (302?) and 203 (303?) will be defined as initial operations.

After sample conversion for eight quadrature conversions is finished, the control circuit 20 which recognizes that the initial operation is completed by the initial operation control unit 21 shifts control to the steady operation to output the clock start signal SC and supply the same to the divider circuit 10. Then, the divider circuit 10 starts outputting the sum-of-product operation start signal SM and supplies the same to the sum-of-product operation circuit 43 in the band synthesis filter 40 in response to the application of the clock start signal SC.

The sum-of-product operation circuit 43 executes the sum-of-product operation in response to the application of the sum-of-product operation start signal SM (Step 304). Then, the circuit 43 outputs the speech signal AF obtained by the sum-of-product operation, while outputting the sum-of-product operation end signal EM and supplying the same to the control circuit 20. The control circuit 20 hereinafter repeats the operation of outputting the quadrature conversion start signal SA and supplying the same to the quadrature conversion circuit 41 in response to the application of the sum-of-product end signal EM from the sum-of-product operation circuit 43.

The quadrature conversion circuit 41 conducts quadrature conversion with respect to one inverse quantization sample IQ (Step 305). Hereinafter, the steady operations at Steps 204 and 205 will be repeated until all the inverse quantization samples IQ are converted into speech signals.

Next, description will be made of a time period between when the inverse quantization sample IQ is applied to the input buffer 30 and when the sum-of-product operation circuit 43 starts outputting the speech signal AF.

As described above, the band synthesis filter 40 has a delay equivalent to the sampling cycles 1/fs (=ts) for 256 samples (256×ts). In other words, the speech signal AF is not output until the conversion results RA for eight conversions, that is, the conversion results RA of 256 samples (=32 samples x eight times), are stored in the filter buffer 42. In the speech signal processing circuit of the present embodiment, operation processing whose operation amount is the largest and whose required time is the longest are the quadrature conversion processing by the quadrature conversion circuit 41 and the sum-of-product operation processing by the sum-of-product operation circuit 43. Operation times required for the other processings are almost negligible as compared with the times required for these operation processings. Therefore, a time between the application of the inverse quantization sample IQ and the output of the speech signal AF is calculated based on the time required for the quadrature conversion processing and the sum-of-product operation processing.

In the present embodiment, first, upon application of the inverse quantization sample IQ, the band synthesis filter 40 starts quadrature conversion and repeats it eight times as the initial operation. Thereafter, as the steady operation, the sum-of-product operation start signal SM is applied to the sum-of-product operation circuit 43 in a cycle of ts to start externally outputting the speech signal AF. Therefore, at the time when the sum-of-product operation circuit 43 starts the sum-of-product operation, quadrature conversion will have been executed eight times and conversion results RA of the eight conversions will have been stored in the filter buffer 42, whereby the speech signal AF is immediately output at the execution of the first sum-of-product operation. As a result, a time required between the application of the inverse quantization sample IQ to the input buffer 42 and the output of the speech signal AF by the sum-of-product operation circuit 43 will be a sum of an operation time for eight quadrature conversions in the initial operation and an operation time for one sum-of-product operation in the steady operation.

Here, since time required for one quadrature conversion is approximately 180 µs and time required for one sum-of-product operation is approximately 3 *s, time required between the application of the inverse quantization sample IQ to the input buffer 42 and the output of the speech signal AF by the sum-of-product operation circuit 43 will be approximately 180 µs×8 times +3 µs=1.4 ms. This required time, that is, delay time, is extremely short as compared with some 5 ms required for the processing by a conventional speech signal processing circuit to such an extent that causes no problem when used in the synchronization with other signals such as a video signal.

Figure 4:
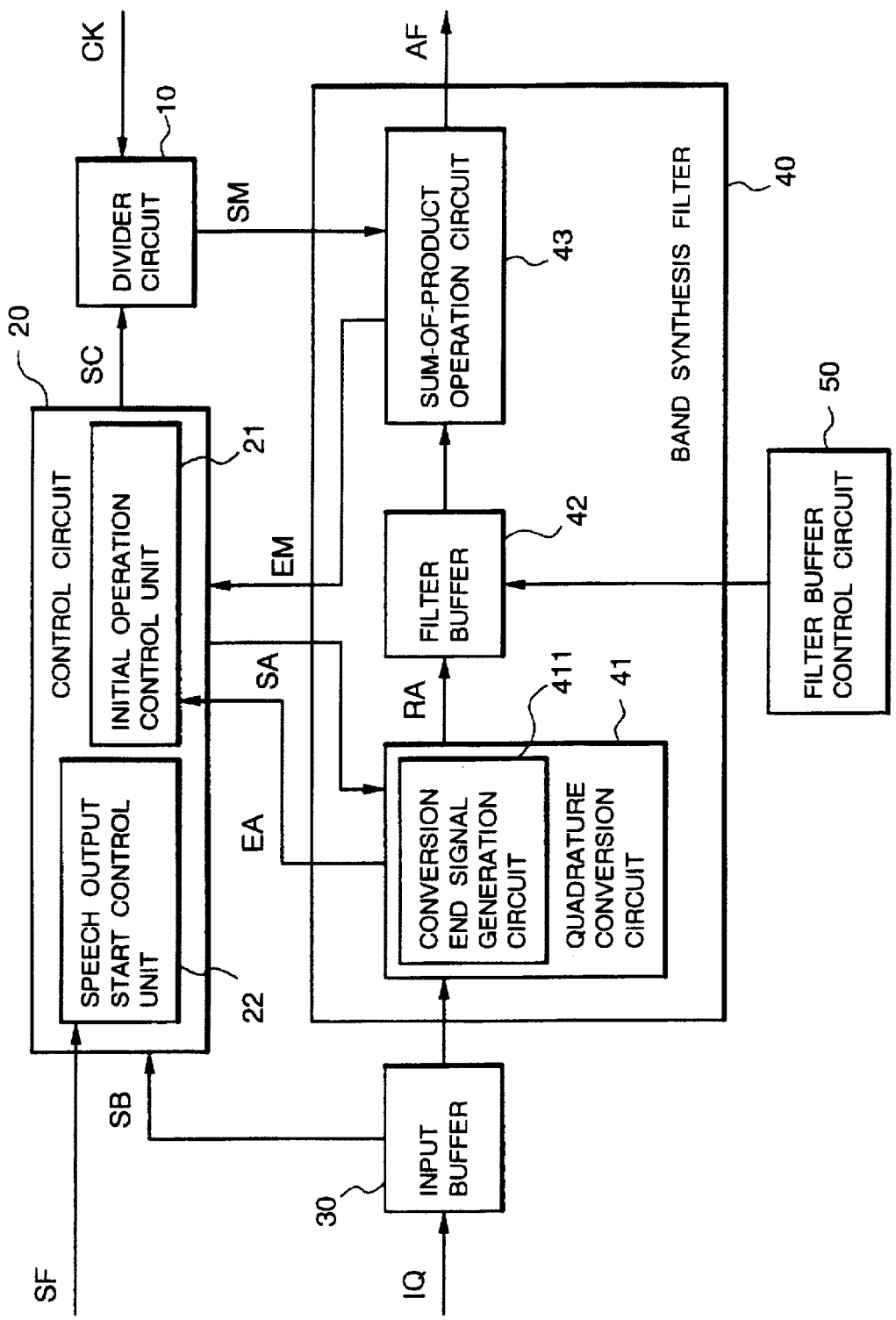
FIG. 4 is a block diagram showing structure of a speech signal processing circuit according to a second embodiment of the present invention.

FIG. 4 is a block diagram showing structure of a speech signal processing circuit according to the second embodiment of the present invention.

The present embodiment is structured such that after the initial operation similar to that of the first embodiment, timing for starting output of a speech signal by the steady operation is controlled. When speech and motion pictures are reproduced at the same time, there occurs a case at a certain processing speed of a system where while processing for speech signals is completed and they are ready for output, processing for image signals is not yet completed, so that such speech signals can not be synchronized with motion pictures. In such a case, it is necessary to delay outputting of the speech signals for a fixed time after the initial operation without immediately shifting to the steady operation.

As illustrated in the figure, the speech signal processing circuit of the present embodiment includes an input buffer 30 for receiving input of an inverse quantization sample and temporarily storing the same, a band synthesis filter 40 for converting the inverse quantization sample into a speech signal, a divider circuit 10 and a control circuit 20 for controlling operation timing of the band synthesis filter 40, and a filter buffer control circuit 50 for controlling a filter buffer in the band synthesis filter 40. The band synthesis filter 40 includes a quadrature conversion circuit 41 for conducting quadrature conversion of an inverse quantization sample, a filter buffer 42 for storing a quadrature conversion result and a sum-of-product operation circuit 43 for executing sum-of-product operation with respect to a quadrature operation result to output a speech signal. In the figure, only the characteristic components of the present embodiment are shown and no illustration will be given of the other components.

In the above described structure, the divider circuit 10, the input buffer 30, the band synthesis filter 40 and the filter buffer control circuit 50 are the same as their counterparts in the first embodiment shown in FIG. 1.

The control circuit 20, similarly to the above-mentioned control circuit 20 of the first embodiment, controls operation timing of the quadrature conversion processing conducted by the quadrature conversion circuit 41 by outputting the quadrature conversion start signal SA and supplying the same to the quadrature conversion circuit 41. In addition, the control circuit 20 includes an initial operation control unit 21 for controlling quadrature conversion of a predetermined number of samples in the initial operation. The control unit 20 of the present embodiment further includes a speech output start control unit 22 for controlling timing for starting speech output from the sum-of-product operation circuit 43 in the band synthesis filter 40.

After the initial operation under the control of the initial operation control unit 21 is finished, the speech output start control unit 22 holds off output of the clock start signal SC from the control circuit 20 to the divider circuit 10 until it receives input of a speech output start signal SF. Here, the speech output start signal SF is a signal to be externally supplied for requesting speech signal output. With a supply of the speech output start signal to the speech output start control unit 22, it is therefore possible to control timing for starting the steady operation to output a speech signal.

Figure 5:
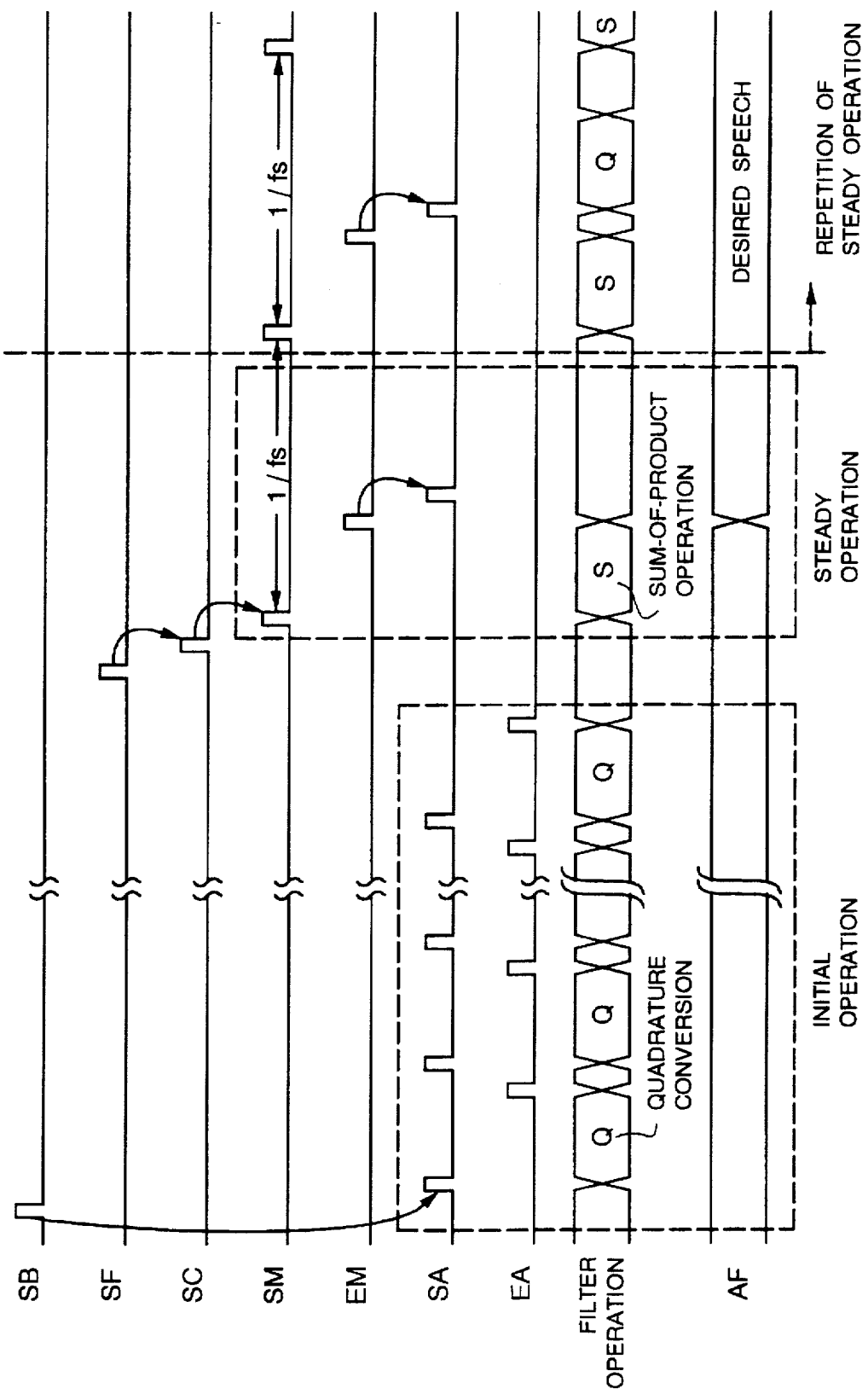
FIG. 5 is an operation time chart showing processing steps according to the second embodiment.
Figure 6:
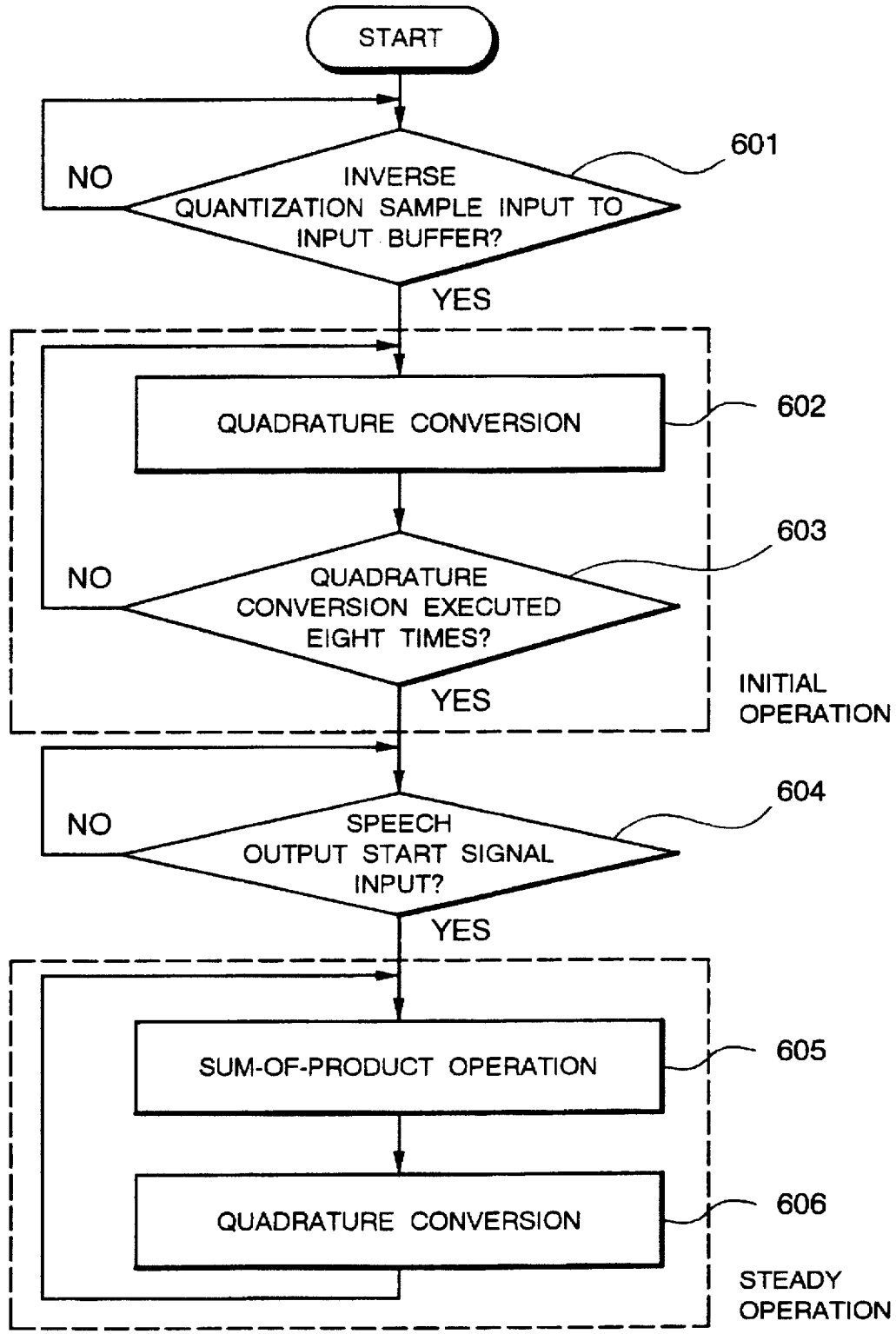
FIG. 6 is a flow chart showing operation of the second embodiment.
Figure 7:
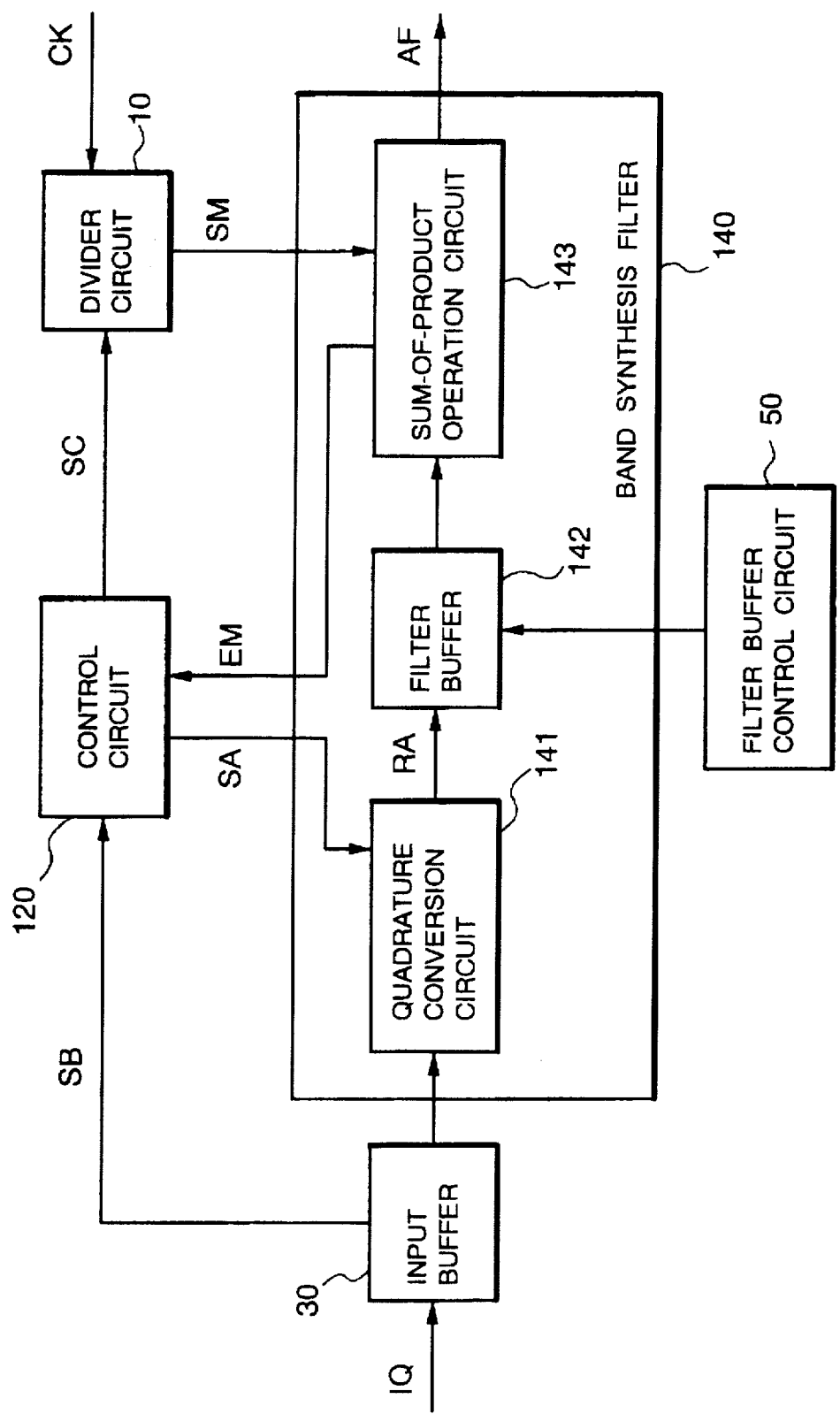
FIG. 7 is a block diagram showing structure of a conventional speech signal processing circuit.
Figure 8:
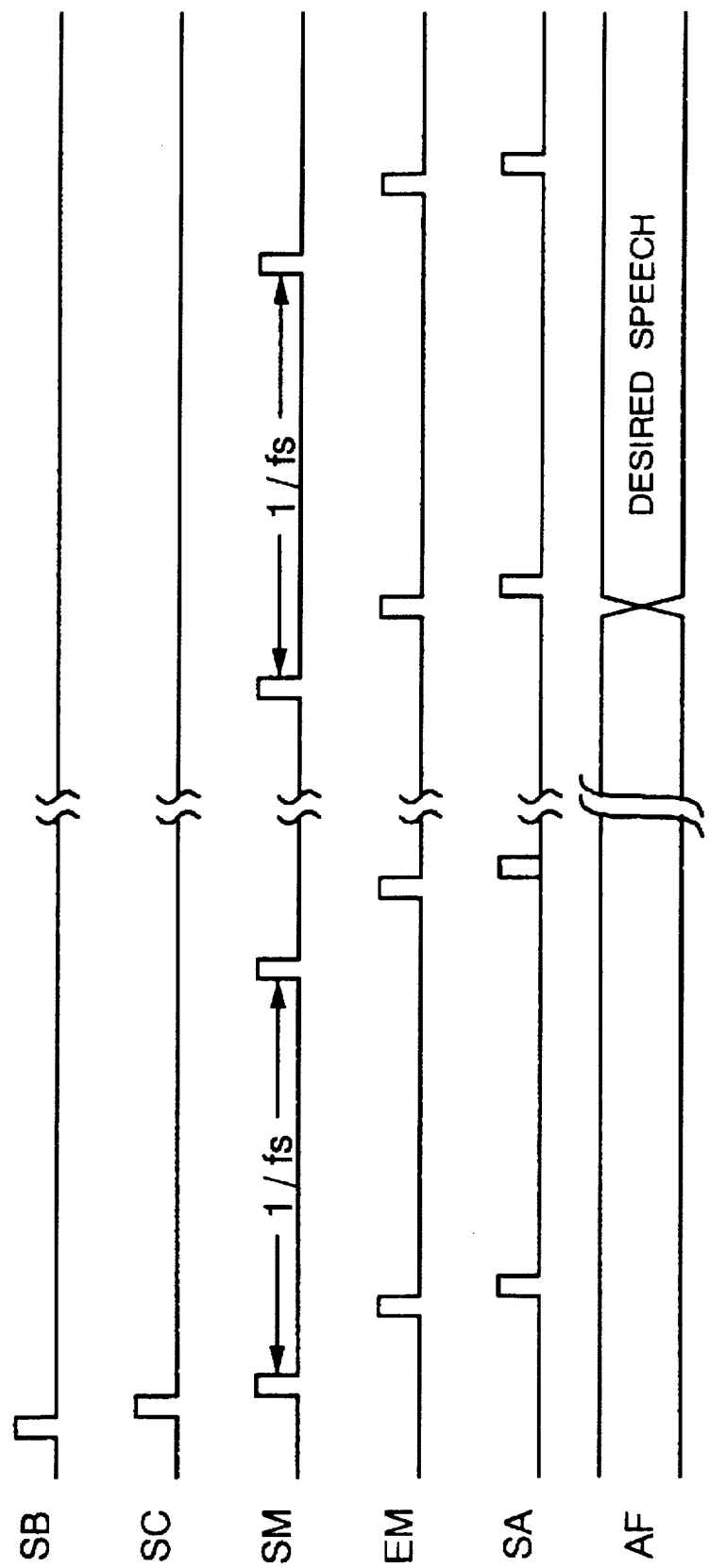
FIG. 8 is an operation time chart showing processing steps by the conventional speech signal processing circuit.
Figure 9:
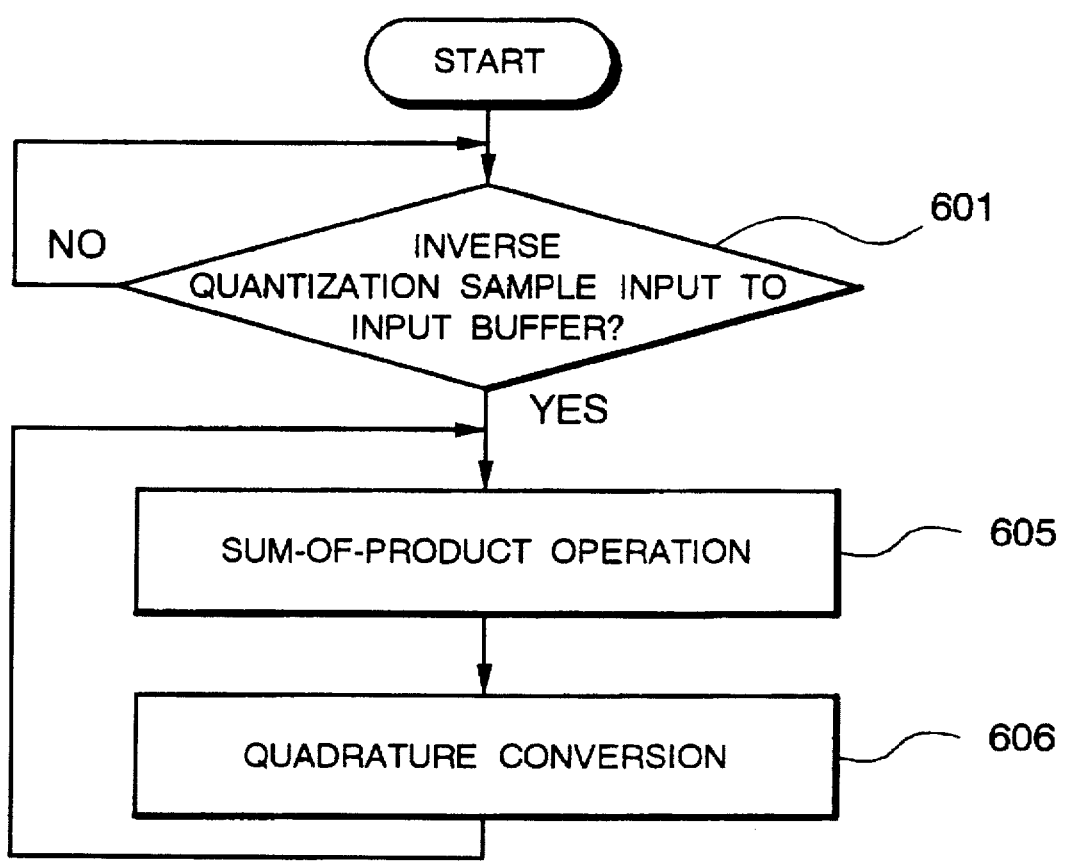
FIG. 9 is a flow chart showing operation of the conventional speech signal processing circuit.

Description will be now made of operation of the present embodiment with reference to the block diagram of FIG. 4, the operation time chart of FIG. 5 and the flow short of FIG. 6.

Figure 3:
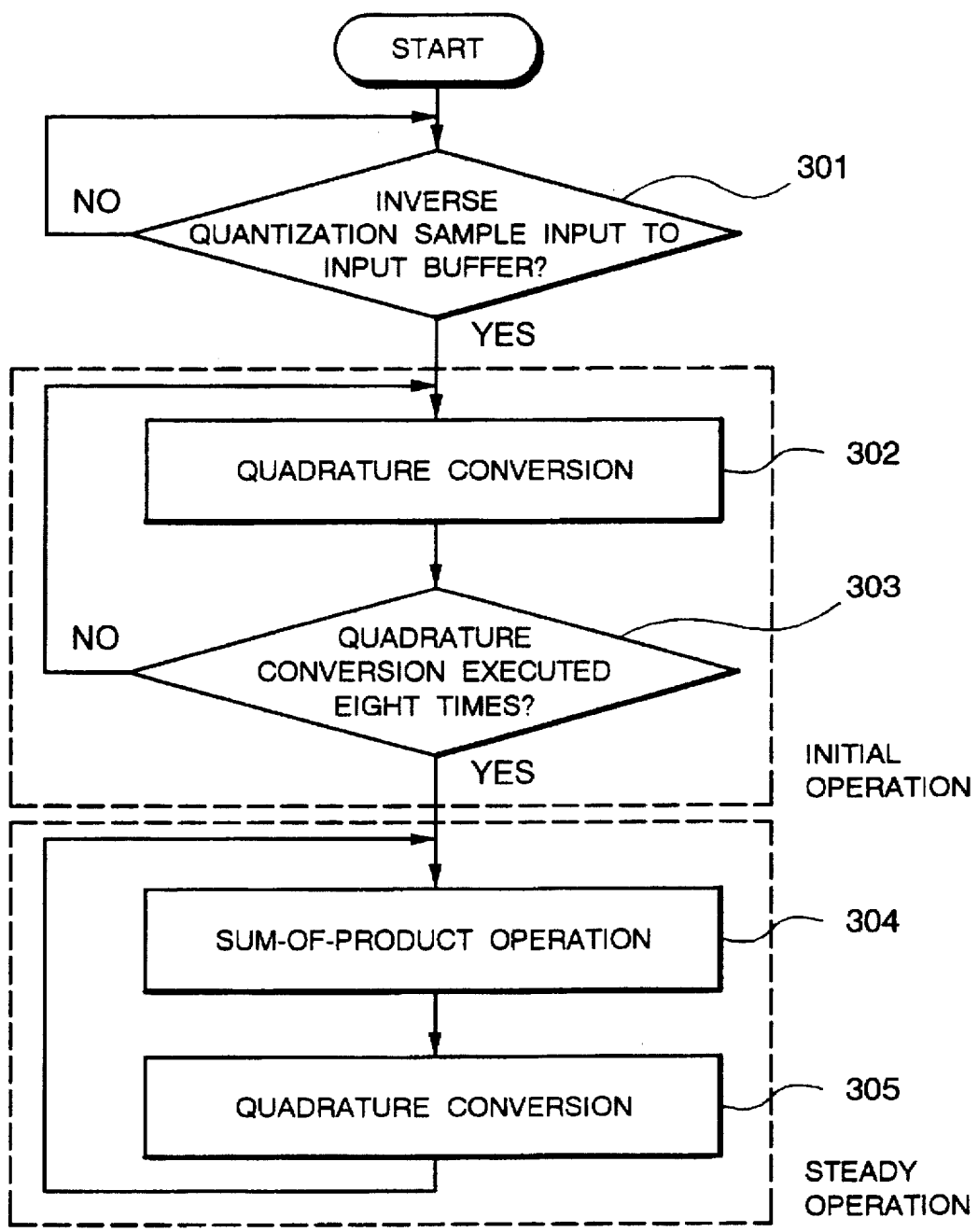
FIG. 3 is a flow chart showing operation of the first embodiment.

In the present embodiment, operations executed between the application of the inverse quantization sample IQ to the input buffer 30 (Step 601) and the completion of quadrature conversion by the initial operation (Steps 602 and 603) are the same as those of the initial operation (see Steps 302 and 303) of the first embodiment shown in FIG. 3.

Thereafter, the control circuit 20 once stops the operation of the band synthesis filter 40 to wait for the application of the speech output start signal SF (Step 604). When the speech start signal SF is applied to the speech output start control unit 22, the clock start signal SC is output from the control circuit 20 and supplied to the divider circuit 10 to start the steady operation of repeating the sum-of-product operation by the sum-of-product operation circuit 43 and the quadrature conversion by the quadrature conversion circuit 41 (Steps 605 and 606). Details of this steady operation are the same as those of the steady operation (see Steps 303 and 304) of the first embodiment shown in FIG. 3.

As described in the foregoing, since quadrature conversion is conducted eight times by the initial operation prior to the application of the speech output start signal SF to the speech output start control unit 22, the sum-of-product operation circuit 43 of the band synthesis filter 40 immediately outputs the speech signal AF upon receiving the speech output start signal SF. In other words, delay time between when the speech output start signal SF is supplied and when the speech signal AF is output can be reduced down to approximately zero. It is apparent that supplying the speech output start signal SF 5 ms after the supply of the inverse quantization sample IQ enables the present embodiment to conduct the same operation as that of a conventional speech signal processing circuit.

As described in the foregoing, because of a means for controlling a quadrature conversion circuit such that quadrature conversion is conducted as many times as a predetermined number of samples within such a time period shorter than a delay time of a band synthesis filter that has no adverse effect in practical use, the present invention involves no problem when synchronization with other signals such as a video signal is required by drastically reducing a delay time between the input of an inverse quantization sample and the output of a speech signal.

Moreover, a means for controlling timing for outputting a speech signal after quadrature conversion of an inverse quantization sample is started greatly facilitates such an operation as synchronization with other signals.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A speech signal processing circuit for decoding a coded speech signal, comprising:

an input buffer for receiving and temporarily storing a coded speech signal sample;

a band synthesis filter for reading a coded speech signal sample stored in said input buffer and conducting quadrature conversion processing and sum-of-product operation processing to decode the coded speech signal sample into a speech signal; and control means for controlling operation of said band synthesis filter, said control means including:

initial operation executing means for, when recognizing a coded speech signal sample as being stored in said input buffer, conducting, as an initial operation of said band synthesis filter, the quadrature conversion processing of said coded speech signal samples as many times as a number predetermined corresponding to an operation delay time of said band synthesis filter, and steady operation executing means for repeatedly and continuously executing, as a steady operation of said band synthesis filter, the quadrature conversion processing of the coded speech signal samples stored in said input buffer and the sum-of-product operation processing with respect to the results of said quadrature conversion processing after said initial operation is completed.

2. The speech signal processing circuit according to claim 1, wherein the number of repetitions of the quadrature conversion processing in said initial operation equals a value obtained by dividing the operation delay time of said band synthesis filter by a sample cycle of said coded speech signal sample.

3. The speech signal processing circuit as set forth in claim 1, wherein said band synthesis filter comprises conversion end notifying means for, when the quadrature conversion processing for one sample of the coded speech signal samples is executed, notifying said initial operation executing means of said control means of the end of the quadrature conversion of the one sample, and said initial operation executing means recognizes a coded speech signal sample as being stored in said input buffer to control said band synthesis filter to execute the initial operation, counts the number of executions of the quadrature processing based on the notification from said conversion end notifying means, and completes the initial operation to transfer processing to said steady operation executing means when recognizing the quadrature conversion processing as being conducted said predetermined number of times.

4. The speech signal processing circuit as set forth in claim 1, wherein said band synthesis filter comprises conversion end notifying means for, when the quadrature conversion processing for one sample of the coded speech signal samples is executed, notifying said initial operation executing means of said control means of the end of the quadrature conversion of the one sample, and said initial operation executing means recognizes a coded speech signal sample as being stored in said input buffer to control said band synthesis filter to execute the initial operation, counts the number of executions of the quadrature processing based on the notification from said conversion end notifying means, and completes the initial operation to transfer processing to said steady operation executing means when recognizing the quadrature conversion processing as being conducted as many times as a value obtained by dividing the operation delay time of said band synthesis filter by a sample cycle of said coded speech signal sample.

5. The speech signal processing circuit as set forth in claim 1, wherein said band synthesis filter comprises conversion end notifying means for, when the quadrature conversion processing of one sample of the coded speech signal samples is conducted, transmitting an end signal indicative of the end of the quadrature conversion of the one sample to the initial operation executing means of said control means, and said initial operation executing means recognizes a coded speech signal sample as being stored in said input buffer to transmit a start signal for executing the quadrature conversion processing of one sample to said band synthesis filter, counts the number of executions of the quadrature conversion processing based on the end signal sent from said conversion end notifying means after the quadrature conversion processing is executed in response to said start signal, and transmits another start signal for executing the quadrature conversion of one sample to said band synthesis filter in response to the application of said end signal until the quadrature conversion processing is completed said predetermined number of times.

6. The speech signal processing circuit as set forth in claim 1, wherein said band synthesis filter comprises conversion end notifying means for, when the quadrature conversion processing of one sample of the coded speech signal samples is conducted, transmitting an end signal indicative of the end of the quadrature conversion of the one sample to the initial operation executing means of said control means, and said initial operation executing means recognizes a coded speech signal sample as being stored in said input buffer to transmit a start signal for executing quadrature conversion processing of one sample to said band synthesis filter, counts the number of executions of the quadrature conversion processing based on the end signal sent from said conversion end notifying means after the quadrature conversion processing is executed in response to said start signal, and transmits another start signal for executing the quadrature conversion of one sample to said band synthesis filter in response to the application of said end signal until the quadrature conversion processing is completed as many times as a value obtained by dividing the operation delay time of said band synthesis filter by a sample cycle of said coded speech signal sample.

7. The speech signal processing circuit as set forth in claim 1, wherein said control means comprises steady operation start control means for controlling timing for starting execution of the steady operation under the control of said steady operation executing means.

8. The speech signal processing circuit as set forth in claim 1, wherein said control means comprises steady operation start control means for controlling timing for starting execution of the steady operation under the control of said steady operation executing means, said steady operation start control means instructing said steady operation executing means to start execution of the steady operation in response to an externally applied request signal.

9. The speech signal processing circuit as set forth in claim 1, wherein said band synthesis filter comprises conversion end notifying means for, when the quadrature conversion processing for one sample of the coded speech signal samples is executed, notifying the initial operation executing means of said control means of the end of the quadrature conversion of the one sample, said control means comprises steady operation start control means for controlling timing for starting execution of the steady operation under the control of said steady operation executing means, said initial operation executing means recognizes a coded speech signal sample as being stored in said input buffer to control said band synthesis filter to execute the initial operation, counts the number of executions of the quadrature processing based on the notification from said conversion end notifying means, and completes the initial operation to transfer processing to said steady operation start control means when recognizing the quadrature conversion processing as being conducted said predetermined number of times, and said steady operation start control means instructs said steady operation executing means to start execution of the steady operation in response to an externally applied request signal.

10. The speech signal processing circuit as set forth in claim 1, wherein said band synthesis filter comprises conversion end notifying means for, when the quadrature conversion processing for one sample of the coded speech signal samples is executed, notifying the initial operation executing means of said control means of the end of the quadrature conversion of the one sample, said control means comprises steady operation start control means for controlling timing for starting execution of the steady operation under the control of said steady operation executing means, said initial operation executing means recognizes a coded speech signal sample as being stored in said input buffer to control said band synthesis filter to execute the initial operation, counts the number of executions of the quadrature processing based on the notification from said conversion end notifying means, and completes the initial operation to transfer processing to said steady operation start control means when recognizing the quadrature conversion processing as being conducted as many times as a value obtained by dividing the operation delay time of said band synthesis filter by a sample cycle of said coded speech signal sample, and said steady operation start control means instructs said steady operation executing means to start execution of the steady operation in response to an externally applied request signal.

11. A speech signal processing method for decoding a coded speech signal implemented by a speech signal processing circuit including an input buffer for receiving and temporarily storing a coded speech signal sample, a band synthesis filter for reading the coded speech signal samples stored in said input buffer one by one and conducting quadrature conversion processing and sum-of-product operation processing to decode the coded speech signal samples into speech signals, and control means for controlling operation of said band synthesis filter, said method comprising the steps of:

a first step at which said input buffer receives input of a coded speech signal sample, a second step at which said control means recognizes a coded speech signal sample as being stored in said input buffer and executes, as an initial operation of said band synthesis filter, the quadrature conversion processing of said coded speech signal samples as many times as a number predetermined corresponding to an operation delay time of said band synthesis filter, and a third step at which said control means repeatedly and continuously executes, as a steady operation of said band synthesis filter, the quadrature conversion processing of the coded speech signal samples stored in said input buffer and the sum-of-product operation processing with respect to the results of said quadrature conversion processing after said initial operation is completed.

12. The speech signal processing method as set forth in claim 11, wherein said band synthesis filter comprises conversion end notifying means for, when the quadrature conversion processing of one sample of the coded speech signal samples is conducted, notifying initial operation executing means of said control means of the end of the quadrature conversion for the one sample, and wherein said second step for executing the initial operation under the control of said control means comprises the steps of:

recognizing a coded speech signal sample as being stored in said input buffer to control said band synthesis filter to execute the initial operation, when said band synthesis filter conducts the quadrature conversion processing for one sample of the coded speech signal samples, accepting notification of the end of the quadrature conversion of the one sample sent from said conversion end notifying means to said control means and counting the number of executions of the quadrature conversion processing based on the notification from said band synthesis filter, and completing the initial operation to start said steady operation when recognizing the quadrature conversion processing as being executed said predetermined number of times.

13. The speech signal processing method as set forth in claim 11, wherein said band synthesis filter comprises conversion end notifying means for, when the quadrature conversion processing of one sample of the coded speech signal samples is conducted, notifying initial operation executing means of said control means of the end of the quadrature conversion for the one sample, and wherein said second step for executing the initial operation under the control of said control means comprises the steps of:

recognizing a coded speech signal sample as being stored in said input buffer to transmit a start signal for executing the quadrature conversion processing for one sample to said band synthesis filter, after the execution of the quadrature conversion processing in response to said start signal, counting the number of executions of the quadrature conversion processing based on the end signal sent from said conversion end notifying means, and transmitting another start signal for executing the quadrature conversion processing for one sample to said band synthesis filter in response to the application of said end signal until the quadrature conversion processing is executed said predetermined number of times.

14. The speech signal processing method as set forth in claim 11, further comprising a third step at which said control means waits for a request signal be externally applied and instructs on the start of execution of the steady operation in response to the application of the request signal after the completion of the second step.

15. The speech signal processing method as set forth in claim 11, wherein said band synthesis filter comprises conversion end notifying means for, when the quadrature conversion processing of one sample of the coded speech signal samples is conducted, notifying initial operation executing means of said control means of the end of the quadrature conversion of the one sample, and which further comprises a third step at which said control means waits for a request signal be externally applied and instructs on the start of execution of the steady operation in response to the application of the request signal after the completion of the second step, and wherein said second step for executing the initial operation under the control of said control means comprises the steps of:

recognizing a coded speech signal sample as being stored in said input buffer to control said band synthesis filter to execute the initial operation, when said band synthesis filter conducts the quadrature conversion processing of one sample of the coded speech signal samples, accepting the notification of the end of the quadrature conversion for the one sample sent from said conversion end notifying means to said control means and counting the number of executions of the quadrature conversion processing based on the notification from said band synthesis filter, and completing the initial operation to enter a state for waiting for application of said request signal when recognizing the quadrature conversion processing as being conducted said predetermined number of times.

16. A computer readable memory which is installed in a speech signal processing circuit including an input buffer for receiving and temporarily storing a coded speech signal sample, a band synthesis filter for reading the coded speech signal samples stored in said input buffer one by one and conducting quadrature conversion processing and sum-of-product operation processing to decode the coded speech signal samples into speech signals, and a control unit for controlling operation of said band synthesis filter, and which stores a computer program instructing said control unit to control operation of said band synthesis filter, said computer program comprising the steps of:

a first step for recognizing a coded speech signal sample as being stored in said input buffer and executing, as an initial operation of said band synthesis filter, quadrature conversion processing of said coded speech signal samples as many times as a number corresponding to an operation delay time of said band synthesis filter, a second step for waiting for a request signal to be externally applied and instructing on a start of execution of a steady operation of said band synthesis filter in response to the application of the request signal after completion of said first step, and a third step for repeatedly and continuously executing, as the steady operation of said band synthesis filter, the quadrature conversion processing of the coded speech signal samples stored in said input buffer and the sum-of-product operation processing with respect to the results of said quadrature conversion processing after completion of said initial operation, wherein said band synthesis filter decodes the coded speech signal samples into the speech signals.

17. A speech signal processing circuit for decoding a coded speech signal, comprising:

an input buffer configured to receive and to temporarily store a coded speech signal sample;

a band synthesis filter connected to said input buffer and configured to read a coded speech signal sample stored in said input buffer and to conduct quadrature conversion processing and sum-of-product operation processing to decode the coded speech signal sample into a speech signal; and a control circuit connected to said input buffer and to said band synthesis filter and configured to control operation of said band synthesis filter, said control circuit including, an initial operation execution unit configured to conduct, when recognizing a coded speech signal sample as being stored in said input buffer, an initial operation of said band synthesis filter involving the quadrature conversion processing of said coded speech signal samples as many times as a predetermined number corresponding to an operation delay time of said band synthesis filter, and a steady operation execution unit configured to repeatedly and continuously execute, as a steady operation of said band synthesis filter, the quadrature processing of the coded speech signal samples stored in said input buffer and the sum-of-product operation processing with respect to the results of said quadrature conversion processing after said initial operation is completed.

\* \* \* \* \*